United States Patent [19]

Bothe

[11] Patent Number: 5,096,770
[45] Date of Patent: Mar. 17, 1992

[54] POLYPROPYLENE FILM WITH FAVORABLE ADHESIVE PROPERTIES

[75] Inventor: Lothar Bothe, Mainz-Gonsenheim, Fed. Rep. of Germany

[73] Assignee: Hoechst Aktiengesellschaft, Frankfurt am Main, Fed. Rep. of Germany

[21] Appl. No.: 586,992

[22] Filed: Sep. 24, 1990

[30] Foreign Application Priority Data

Oct. 9, 1989 [DE] Fed. Rep. of Germany ....... 3933695

[51] Int. Cl.$^5$ .......................... B32B 7/02; B32B 27/08
[52] U.S. Cl. ..................................... 428/216; 428/511; 428/516
[58] Field of Search .................. 428/216, 511, 516

[56] References Cited

U.S. PATENT DOCUMENTS

| | | | |
|---|---|---|---|
| 4,419,411 | 12/1983 | Park | 428/516 |
| 4,508,804 | 4/1985 | Asao et al. | 430/62 |
| 4,654,252 | 3/1987 | Doyen | 428/213 |
| 4,725,466 | 2/1988 | Crass et al. | 428/35 |

FOREIGN PATENT DOCUMENTS 0234758 9/1987 European Pat. Off. .

OTHER PUBLICATIONS

Molecular Weights.
James C. Randall, "Methylene Sequence Distributions and Number Average Sequence Lengths in Ethylene-Propylene Copolymers", Ethylene-Propylene Copolymers, vol. 11, No. 1, Jan.-Feb., 1978, pp. 33-36.

*Primary Examiner*—Merrell C. Cashion, Jr.
*Assistant Examiner*—D. S. Nakarani
*Attorney, Agent, or Firm*—Foley & Lardner

[57] ABSTRACT

A non-sealable, multi-layer polypropylene film which includes a base layer of polypropylene and at least one cover layer. The cover layer includes a propylene-ethylene copolymer which includes about 1.2 to 2.8% by weight of ethylene and has a distribution factor $V_F$ greater than about 10, an enthalpy of fusion $\Delta H_m$ greater than about 90 J/g and a melt index of about 3 to 12 g/10 min. under a load of 21.6N and about 230° C. The film is particularly useful in laminating and as a support film for aqueous coating systems.

18 Claims, 1 Drawing Sheet

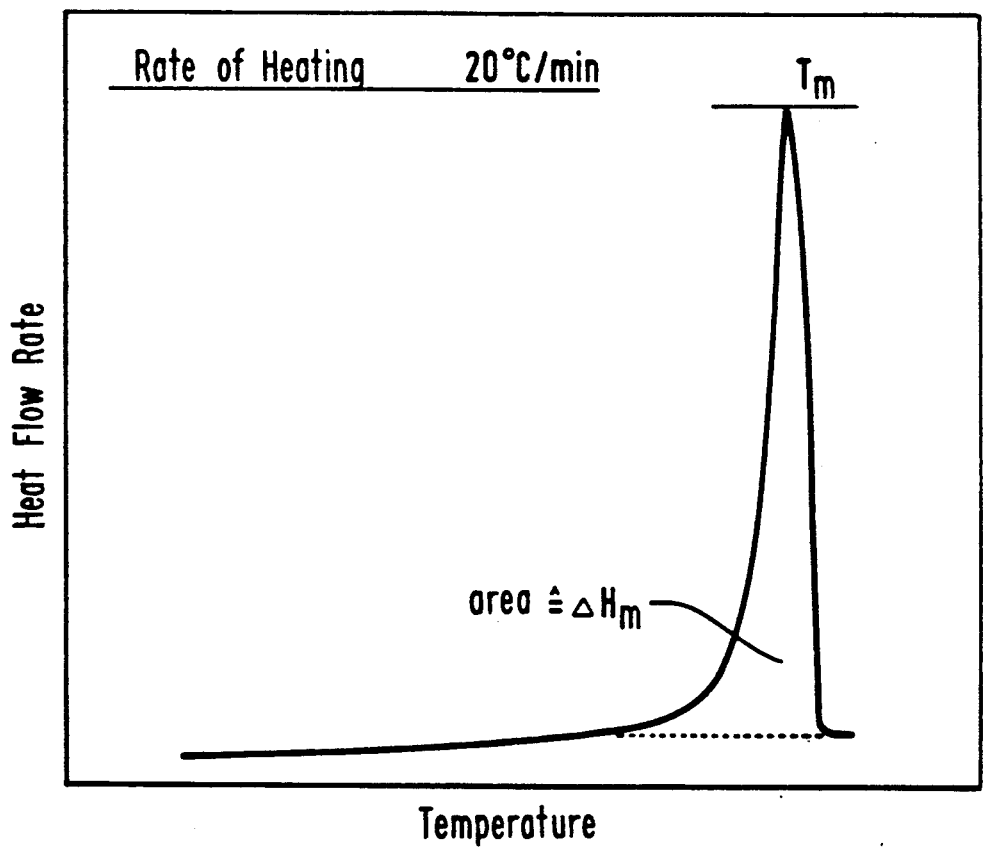

POLYPROPYLENE FILM WITH FAVORABLE ADHESIVE PROPERTIES

BACKGROUND OF THE INVENTION

The present invention relates to a non-sealable, multi-layer polypropylene film and to the production and use of the same.

Sealable and non-sealable polypropylene films have been described in numerous publications. A problem which frequently occurs in these films is connected with the adhesion of coatings, printings or adhesives to films of this kind, which is usually insufficient owing to the highly non-polar character of polyolefins. In view of the increasing strengthening of environmental protection regulations, aqueous coating systems have gained in importance. These systems, however, lead to particularly great adhesive difficulties due to their polarity.

EP-A-0 234 758 describes a polypropylene film and states that aqueous coatings are readily applicable to this film. A substantial drawback of this film, however, is that it possesses good coating qualities only shortly after its production, but loses these qualities during storage. In the preparation of laminates from this film using water-based adhesives, it has been found that curing of the adhesives is retarded considerably relative to storage time.

SUMMARY OF THE INVENTION

It is therefore an object of the present invention to provide a polypropylene film which possesses, in addition to the typical properties such as gloss, scratch resistance, transparency, etc., a very good long-term stability of its adhesive properties with respect to coatings, especially aqueous coating systems, printings and adhesives. It is also an object to provide a laminate or composite which includes as one component the polypropylene film according to the present invention.

In accomplishing the foregoing objects there is provided according to the present invention a non-sealable, multi-layer polypropylene film comprising a base layer comprised of polypropylene and at least one cover layer disposed on said base layer, wherein said cover layer comprises a propylene-ethylene copolymer which includes about 1.2 to 2.8% by weight of ethylene and has a distribution factor $V_F$ greater than about 10, an enthalpy of fusion $\Delta H_m$ greater than about 90 J/g and a melt index of about 3 to 12 g/10 min. under a load of 21.6N and at 230° C. There also is provided according to the present invention a film or paper laminate or composite which comprises as one component the above-described polypropylene film. In addition, there is provided a support film for an aqueous coating system, comprising the above-described polypropylene film.

Further objects, features and advantages of the present invention will become apparent from the detailed description of preferred embodiments that follows.

BRIEF DESCRIPTION OF THE DRAWINGS

The preferred embodiments of the present invention will be described in conjunction with FIG. 1 which illustrates how the enthalpy of fusion $\Delta H_m$ of the present invention is measured.

DETAILED DESCRIPTION OF THE PREFERRED EMBODIMENTS

The base layer of the multi-layer film according to the present invention comprises a propylene polymer which contains a predominant proportion of propylene and preferably has a melting point of about 162° to 168° C. Isotactic polypropylene with an n-heptane-soluble component of about 6% by weight or less is a preferred propylene polymer. The propylene polymer of the base layer generally has a melt index of about 1.5 to 5 g/10 min. at 230° C. and under a load of 21.6N, measured according to DIN 53 735.

The cover layer comprises an ethylenepropylene copolymer which has an ethylene content of about 1.2 to 2.8% by weight, preferably 1.6 to 2.4% by weight, a distribution factor greater than about 10, preferably about 15, and an enthalpy of fusion greater than 90 J/g, preferably in the range from about 95 to 110 J/g. The melt index of the ethylene-propylene copolymer, preferably from about 3 to 12 g/10 min. under a load of about 21.6N and at about 230° C., is greater than the melt index of the polypropylene of the base layer. The number average of the molecular mass ranges between about 50,000 and 90,000 g/mol, preferably between about 65,000 and 80,000 g/mol. The weight average of the molecular mass ranges between about 150,000 and 450,000 g/mol, preferably between about 180,000 and 320,000 g/mol.

The ethylene content and the distribution factor of the copolymer were determined with the aid of $C_{13}$ NMR spectroscopy. The measurements were carried out using a nuclear resonance spectrometer model HX-270 supplied by Bruker, (Germany), which was equipped with a Bruker Aspect 2000 computer, supplied by Bruker.

To analyze the ethylene-propylene copolymer, the copolymer was dissolved in a solvent mixture made from 65% by volume of hexachlorobenzene and 35% by volume of 1,1-dideuterotetrachloroethane, so that a 10% by weight solution resulted. Octamethyltetrasiloxane (OMTS) was added as reference standard. The 67.9 MHZ $C_{13}$ nuclear resonance spectrum was measured at 130° C. The evaluation of the spectra was carried out in accordance with the procedure described in J. C. Randall, Polymer Sequence Distribution (Academic Press, New York, 1977). The distribution factor is defined as $$V_F = \frac{C_i}{C_G - C_i}$$

in which $C_G$ denotes the total content of ethylene in the copolymer in % by weight and $C_i$ denotes the proportion of ethylene in % by weight, which is present as isolated ethylene component, i.e., a single ethylene unit located between two propylene units in the following illustrated manner:

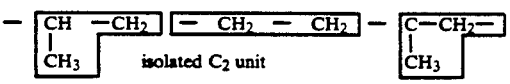

The enthalpy of fusion $\Delta H_m$ is determined using the method of differential scanning calorimetry (DS measurement). A sample of the raw material to be measured (about 3 to 5 mg) is first heated to 200° C. in a differential calorimeter and then cooled at a rate of 10° C./min.

to a temperature below its melting point. Thereafter the sample is again heated at a defined rate of 20° C./min. The enthalpy of fusion $\Delta H_m$ of the raw material is obtained from the area below the corresponding fusion peak. The attached FIG. 1 shows a diagram which illustrates the above-described method of measurement. In the diagram, the heat flow rate at 20° C./min. is plotted against temperature. To determine the area which corresponds to the ethalpy of fusion $\Delta H_m$ the bottom is separated on the left and right of the fusion peak $T_m$ by a dotted tangent line.

It unexpectedly has been found that the above-described parameters for the propyleneethylene copolymer of the cover layer of the film according to the present invention must be kept within very narrow limits, in order to optimize simultaneously all of the advantageous properties. The ethylene content and the distribution factor $V_F$ of the copolymer are of importance for the suitability for surface treatment by means of electrical corona discharge, for the long-term stability of the adhesive properties and for the optical properties. If the ethylene content is below about 1.2% by weight, the suitability for corona treatment is poor and the decay characteristics of the treatment effect are unfavorable. If the ethylene content is above about 2.8% by weight or the distribution factor is below about 10, the optical properties, particularly the surface gloss are impaired. The scratch resistance of the film is influenced by the enthalpy of fusion of the copolymer. If the latter is below about 90 J/g, the scratch resistance and the blocking resistance are significantly impaired.

The film according to the present invention typically has a total thickness from about 10 to 50 μm. Preferably, the cover layer has a thickness between about 0.4 to 1 μm.

To further improve particular properties of the film according to the present invention the layers can include active ingredients, preferably antistatic agents and/or slip agents, each in an effective amount.

Preferred antistatic agents include essentially straight-chain and saturated aliphatic, tertiary amines containing an aliphatic radical with 10 to 20 carbon atoms, which are substituted by 2-hydroxyalkyl-($C_1$ to $C_4$) groups; particularly suitable are N,N-bis-(2-hydroxyethyl)-alkylamines containing $C_{10}$–$C_{20}$, preferably $C_{12}$–$C_{18}$, alkyl groups. The effective amount of antistatic agent varies in the range from about 0.05 to 1% by weight, based on the layer. It has been found particularly advantageous to add to the base layer about 0.1 to 0.25% by weight of an N,N-bis-ethoxy-alkylamine with aliphatic radicals having 10 to 22 carbon atoms.

Advantageous slip agents comprise carboxylic acid amides, such as erucic acid amide and stearic acid amide or polydiorgano-siloxanes.

Preferably the cover layer or cover layers additionally include known inorganic or organic antiblocking agents. Advantageous antiblocking agents are inorganic additives such as silicon dioxide and calcium carbonate or the like, or organic additives such as benzoguanamineformaldehyde copolymers. It is essential for the antiblocking agent to have an average particle size between about 1 and 4 μm. The index of refraction of the antiblocking agents ranges between about 1.4 and 1.6. The amount of antiblocking agent added is about 0.1 to 0.5% by weight, based on the weight of the cover layers.

The production of the polyolefin film according to the invention, which may comprise two or three layers and in which the cover layers may have the same or different compositions, is carried out by known coextrusion processes. Operation of these processes include coextruding through a flat sheet dye the melts corresponding to the individual layers of the film, cooling the film obtained by coextrusion in order to solidify it, biaxially stretching (orienting) the film, heat-setting the biaxially stretched film and corona treating on the surface layer intended for corona treatment. The biaxial stretching (orientation) may be carried out simultaneously or successively, the successive biaxial stretching, in which the film is stretched initially longitudinally (in the machine direction) and then transversely (perpendicular to the machine direction), being preferred. The polymer or the polymer mixture of the individual layers is thus first compressed or liquefied in an extruder as in the conventional coextrusion process. The melts are then simultaneously extruded through a flat sheet dye (slot dye), and the extruded multi-layer film is cooled and solidified on one or more rolls, which are kept at about 30° to 50° C. by cooling. The film thus obtained is then stretched longitudinally and transversely to the extrusion direction which produces an orientation of the molecule chains. The film preferably is stretched to a ratio of about 4 to 7:1 in the longitudinal direction and preferably to a ratio of about 8 to 10:1 in the transverse direction. The longitudinal stretching is preferably carried out at a film temperature of about 120° to 140° C. and the transverse stretching preferably at about 160° to 175° C. The longitudinal stretching is carried out advantageously with the aid of two rolls running at different speeds according to the stretch ratio desired and the transverse stretching with the aid of a corresponding tenter frame. Biaxial stretching of the film is followed by heat-setting (heat treatment) of the film. For this, the film is kept for about 0.5 to 10 s at a temperature of about 150° to 160° C. The corona treatment is preferably carried out with an alternating voltage of about 10,000 V and 10,000 $H_z$, on one or both surfaces of the film, as desired. The film which has been produced in this manner is wound up in the customary manner with the aid of a take-up unit and has immediately after its production a surface tension on the treated surface of about 36 to 42 mN/m, preferably about 38 to 40 mN/m.

The polyolefin multi-layer film according to the present invention is particularly advantageous for the production of laminates. In fact, it has all the important properties required of polyolefin films with regard to their use as films which are suitable for laminating or coating. In particular, the polyolefin multi-layer film according to the present invention displays:

very good optical properties, in particular gloss and haze, high scratch resistance, good immediate and long-term coating characteristics, in particular in view of aqueous systems, high suitability for surface treatment and good odor properties and good further processing characteristics.

Moreover, the film according to the present invention is suitable especially for use as a support film for aqueous barrier coating systems based, for example, on aqueous dispersions of polyvinylidene chloride or ethylene vinyl alcohol copolymers. It is also particularly suitable for printing with water-based printing inks such as two-component reactive dyes.

In the examples and comparative examples described below, in each case a biaxially-oriented polyolefin film is used (longitudinal stretch ratio 5:1, transverse stretch ratio 10:1) having a base layer and two cover layers, the base layer comprising an isotactic polypropylene with an n-heptane-soluble component of 4% by weight, with a melting point of 165° C. and a melt flow index of 3.5 g/10 min. at 230° C. and under a load of 21.6N (measured according to DIN 53 735) as the main component. The base layer is about 12 μm thick, and the two cover layers, which enclose the base layer, are each about 0.8 μm thick. The triple-layer polyolefin films were produced by the above-described coextrusion process.

For the purpose of stabilizing the film, 0.1% by weight of pentaerythrityl-tetrakis-3-(3,5-ditertiary butyl-4-hydroxyphenyl)-propionate (Irganox 1010®), and for neutralizing acidic catalyst residues 0.05% by weight of calcium stearate, are contained in all layers. The base layer additionally contains 0.2% by weight of N,N-bis-ethoxyalkyamine (alkyl radical $C_{10}$–$C_{22}$).

To analyze the raw materials and films, the following measuring methods were employed:

Ethylene content and distribution factor

As described above.

Melt flow index

In accordance with DIN 53 735 at 230° C. and under a load of 21.6N.

Haze

Haze of the film is measured in accordance with ASTM-D 1003-52, 1° slit aperture being used instead of a 4° circular aperture and the haze is given in percent for four superposed film layers. The four layers were chosen because the optimum measuring range is utilized thereby. The haze evaluation was made as follows: ≦15% = very good, ≧15% to 25% = average, and ≧25% = poor.

Gloss

Gloss is evaluated with the naked eye.

Scratch resistance or susceptibility to scratching

Scratch resistance is determined in accordance with DIN 53 754.

To determine the scratch resistance, the abrasion tester Taber Model 503 Abraser supplied by Teledyne Taber is employed, using abrading disks of the trademark Calibrade R H18 which are loaded with 250 g. Scratch resistance or susceptibility to scratching is understood to mean the increase in haze of the scratched film in comparison with the original film, after 50 revolutions of the test plate. Scratch resistance is described as very good when the increase in haze is less than 20%, as average when the increase in haze is 20 to 25% and as poor at increases in haze exceeding 25%.

Decay characteristics and odor

The corona treatment was carried out in such a way that the treated film surface had, in each case, a treatment intensity of 39 mN/m immediately after the treatment. The treatment intensity was determined by the so-called ink method according to DIN 53 364.

The measurement of treatment intensity was repeated at intervals of 14 days. The decay characteristics were described as very good when the treatment intensity was still at least 37 mN/m after four months (ΔB≦2 mN/m). The decay characteristics were described as poor when the treatment intensity was ≦35 mN/m (ΔB≧4 mN/m).

The odor of the films was assessed by means of an odor test.

Odor

A stack of films (DIN A 4) about 1 cm thick is prepared from the film to be assessed, the stack being enclosed in Al-foil. In order to assess the odor, the stack of films is separated after 2 days storage and the odor between the film layers was sampled.

| Odor classification: | |
|---|---|
| + + | low odor |
| + − | detectable odor |
| − − | strong odor |

Suitability for corona treatment

The films were subjected under identical conditions to a corona treatment. While in the case of Example 1 and of the Comparison Examples CE 1 and CE 3, treatment intensities of 39 mN/m were reached, CE 5 shows an intensity of only 37 mN/m, and CE 4 and CE 6 exhibit a treatment intensity of only 36 mN/m.

Suitability for printing 14 days after being produced (short-term assessment) and 4 months after being produced (long-term assessment) the films were printed. The ink adhesion was assessed using the adhesive tape test. If no ink at all could be removed by the adhesive tape, the ink adhesion was described as very good. In the case of slight removal of ink, the ink adhesion was described as good and in the case of significant ink removal, it was described as poor.

Suitability for bonding with water-based adhesives further processing

To assess the suitability for bonding with water-based adhesives and the further processing characteristics laminates were prepared with pergamyne paper (basis weight 40 g/m²). The adhesive used was the water-based reactive two-component adhesive Aquabond A+C, supplied by Morton Thiokol GmbH, Wikolin Polymer Division (Germany).

The laminates were prepared 10 days after the production of the films and also 4 months after the production of the films. Laminates were classified as very good, in which, immediately after being produced, the laminating strength reached the strength of the paper used. The laminates which required a longer time were classified as average.

Laminates which did not reach the strength of the paper were described as poor.

The structure of the films of the examples and comparison examples is indicated in Table 1. The superior properties of the films according to the present invention are evident from Table 2.

TABLE 1

| | Examples and Comparison Examples | | | | | |
|---|---|---|---|---|---|---|
| | Example 1 | CE1 | CE2 | CE3 | CE4 | CE5 |
| | $C_2C_3$-copolymer | $C_2C_3$-copolymer | $C_2C_3$-copolymer | $C_2C_3$-copolymer | $C_2C_3$-copolymer | polypropylene |
| | $C_2$: 2 weight % | $C_2$: 3 weight % | $C_2$: 4 weight % | $C_2$: 0,6 weight % | $C_2$: 2 weight % | |
| | $C_3$: 98 weight % | $C_3$: 97 weight % | $C_3$: 96 weight % | $C_3$: 99,4 weight % | $C_3$: 98 weight % | |
| | Vf = 19 | Vf = 14 | Vf = 7 | Vf > 20 | Vf 3 | |
| | $\Delta H_m$ = 95 J/g | $\Delta H_m$ = 80 J/g | $\Delta H_m$ = 72 J/g | $\Delta H_m$ = 110 J/g | $\Delta H_m$ = 108 J/g | $\Delta H_m$ = 125 J/g |
| | $i_{2.16}$ = 5 g/10 min. | $i_{2.16}$ = 5.5 g/10 min. | $i_{2.16}$ = 7 g/10 min. | $i_{2.16}$ = 5 g/10 min. | $i_{2.16}$ = 5.2 g/10 min. | $i_{2.16}$ = 5 g/10 min |
| | $T_M$ = 154° C. | $T_M$ = 146° C. | $T_M$ = 139° C. | $T_M$ = 164° C. | $T_M$ = 162° C. | $T_M$ = 165° C. |

TABLE 2

| | Haze | Gloss | Scratch Resistance | Suitability for Surface Treatment | Suitability for Printing/ Suitab. for Adhesive Bonding/Curing short-term | long-term | Odor | Decay Characteristics of Corona Treatment |
|---|---|---|---|---|---|---|---|---|
| Example 1 | ++ | ++ | ++ | ++ | ++ | ++ | ++ | ++ |
| CE1 | -+ | -+ | -+ | ++ | ++ | ++ | -- | ++ |
| CE2 | -+ | -+ | -- | ++ | ++ | ++ | -- | ++ |
| CE3 | ++ | ++ | ++ | -- | ++ | -- | +- | -- |
| CE4 | -- | -- | ++ | -+ | +- | -- | +- | -- |
| CE5 | ++ | ++ | ++ | -- | +- | -- | +- | -- |

++ very good
+- good
-+ average
-- poor

What is claimed is:

1. A non-sealable, multi-layer polypropylene film, comprising a base layer comprised of polypropylene and at least one cover layer disposed on said base layer, wherein said cover layer comprises a propylene-ethylene copolymer which includes about 1.2 to 2.8% by weight of ethylene and has a distribution factor $V_F$ greater than about 10, an enthalpy of fusion $\Delta H_m$ greater than about 90 J/g and a melt index of about 3 to 12 g/10 min. under a load of about 21.6N and at about 230° C.

2. A film according to claim 1, wherein said cover layer comprises an ethylene-propylene copolymer which includes about 1.6 to 2.4% by weight of ethylene and has a distribution factor greater than about 15 and an enthalpy of fusion in the range from about 95 to 110J/g.

3. A film according to claim 1, wherein said ethylene-propylene copolymer of said cover layer has a melt index which is greater than the melt index of said polypropylene of said base layer.

4. A film according to claim 1, wherein said ethylene-propylene copolymer of said cover layer has a molecular mass number average between about 50,000 and 90,000 g/mol.

5. A film according to claim 4, wherein said ethylene-propylene copolymer of said cover layer has a molecular mass number average between about 65,000 and 80,000 g/mol.

6. A film according to claim 1, wherein said ethylene-propylene copolymer of said cover layer has a molecular mass weight average between about 150,000 and 450,000 g/mol.

7. A film according to claim 6, wherein said ethylene-propylene copolymer of said cover layer has a molecular mass weight average between about 180,000 and 320,000 g/mol.

8. A film according to claim 1, wherein said film has been treated with an electrrical corona discharge on at least one surface thereof and has a surface tension on said at least one treated surface from about 36 to 42 mN/m.

9. A film according to claim 8, wherein said treated surface has a surface tension from about 38 to 40 mN/m.

10. A film according to claim 1, wherein said film has a total thickness from about 10 to 50 μm and the cover layer has a thickness between about 0.4 to 1 μm.

11. A film according to claim 1, wherein said base layer comprises isotactic polypropylene having 6% or less by weight of an n-heptane-soluble component.

12. A film according to claim further comprising at least one active ingredient selected from the group consisting of an antistatic agent, a slip agent and an antiblocking agent.

13. A film according to claim 12, wherein said antistatic agent comprises a straight-chain, saturated aliphatic tertiary amine having an aliphatic radical with 10 to 20 carbon atoms and at least one 2-hydroxyalkyl substituent group.

14. A film according to claim 12, wherein said slip agent is selected from the group consisting of a carboxylic acid amide and a polydiorgano-siloxane.

15. A film according to claim 12, wherein said antiblocking agent is selected from the group consisting of silicon dioxide, calcium carbonate and a benzoguanamine-formaldehyde copolymer.

16. A film or paper composite which comprises as one component a polypropylene film according to claim 1.

17. A composite according to claim 16, further comprising a water-based adhesive.

18. A support film for an aqueous coating system, comprising a polypropylene film according to claim 1.

* * * * *